US Patent Number: 4,976,911
Date of Patent: Dec. 11, 1990
Inventor: Charles D. Bowman, Los Alamos, N. Mex.
Assignee: The United States of America as represented by the United States Department of Energy, Washington, D.C.

[54] NUCLEAR REACTIVITY CONTROL USING LASER INDUCED POLARIZATION

[21] Appl. No.: 357,248
[22] Filed: May 26, 1989
[51] Int. Cl.[5] .............................................. G21C 7/06
[52] U.S. Cl. .................................. 376/221; 376/326; 376/331
[58] Field of Search ..................... 376/221, 331, 326

[56] References Cited

U.S. PATENT DOCUMENTS

| | | | |
|---|---|---|---|
| 3,227,619 | 1/1966 | Plante | 376/219 |
| 3,309,284 | 3/1967 | Bennett | 376/333 |
| 3,629,068 | 12/1971 | Lantz et al. | 376/331 |
| 3,868,593 | 2/1975 | Fukuda et al. | 372/56 |
| 3,878,479 | 4/1975 | Heising et al. | 372/56 |
| 3,952,263 | 4/1976 | McArthur et al. | 376/326 |
| 4,017,808 | 4/1977 | Fein et al. | 372/33 |

FOREIGN PATENT DOCUMENTS 1191807  5/1970  United Kingdom ................. 376/326

OTHER PUBLICATIONS

T. E. Chupp et al., "Polarized, High-Density Gaseous $^3$He Targets," 36 Phys. Rev. C, No. 6, pp. 2244–2251 (Dec. 1987).
Laser Interaction and Related Plasma Phenomena, vol. 6, 1984, Plenum Press–New York, Hora et al., pp. 47–65.
Appl. Phys. Left, vol. 36, No. 2, Jan. 1980, pp. 115–117, Carter et al.
Physics Letters, vol. 76A, No. 3,4, (3/31/80), pp. 237–239, Babenko et al.
Progress in Nuclear Energy, vol. 8, No. 1, 1981, pp. 35–52, Prelas et al.

Primary Examiner—Harvey E. Behrend
Attorney, Agent, or Firm—Ray G. Wilson; Paul D. Gaetjens; William R. Moser

[57] ABSTRACT

A control element for reactivity control of a fission source provides an atomic density of $^3$He in a control volume which is effective to control criticality as the $^3$He is spin-polarized. Spin-polarization of the $^3$He affects the cross section of the control volume for fission neutrons and hence, the reactivity. An irradiation source is directed within the $^3$He for spin-polarizing the $^3$He. An alkali-metal vapor may be included with the $^3$He where a laser spin-polarizes the alkali-metal atoms which in turn, spin-couple with $^3$He to spin-polarize the $^3$He atoms.

2 Claims, 5 Drawing Sheets

Fig. 1A
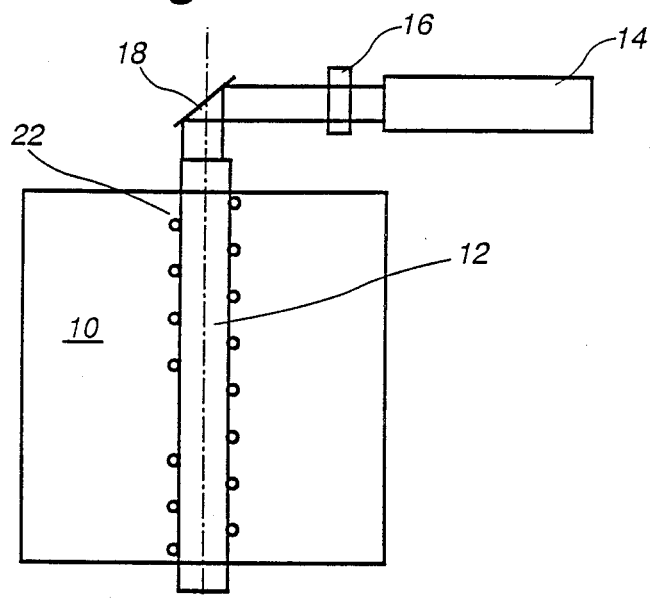
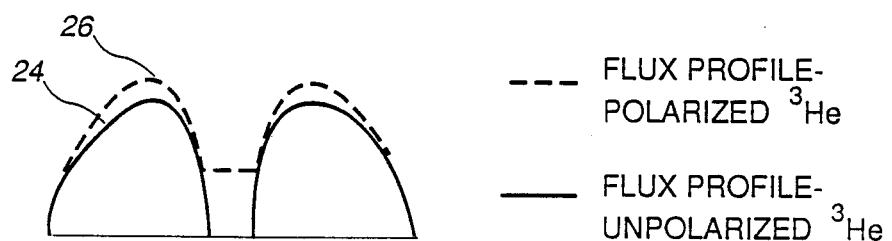
--- FLUX PROFILE- POLARIZED $^3$He
—— FLUX PROFILE- UNPOLARIZED $^3$He
Fig. 1B

NUCLEAR REACTIVITY CONTROL USING LASER INDUCED POLARIZATION

BACKGROUND OF THE INVENTION

This invention relates to nuclear reactors and, more particularly, to the reactivity control of fission reactors. This invention is the result of a contract with the Department of Energy (Contract No. W-7405-ENG-36).

Conventional nuclear fission reactors are controlled by control rods which are mechanically moved within the reactor core to control reactivity by changing the amount of neutron absorbing material in the reactor fission volume. The control rods can introduce a sufficient decrease in reactivity to control the reactor during positive reactivity transients arising from changing operating conditions. A reactivity control swing of only about 1% is typically adequate to provide control wherein the reactor can be reduced to a subcritical reactivity condition following a reactivity excursion. In routine reactor operations, an emergency insertion of the control rods is sometimes required to prevent an uncontrolled reactivity excursion.

It will be appreciated, however, that mechanical control rods have inherent limitations on the rate at which a negative reactivity can be inserted. Physical characteristics, such as inertia and rod length, limit the speed at which the control rod can be inserted into the reactor core. Further, the mechanical instability of the fuel elements in which the control rods are inserted can act to limit the insertion rate or even to preclude rod insertion.

These and other problems of the prior art are overcome by the present invention, and an improved reactivity control system is provided which is not dependent on mechanical components.

Accordingly, it is an object of the present invention to provide a control system for a nuclear reactor which does not depend on mechanical control rods.

It is another object of the present invention to provide a nuclear reactor control system which can introduce a negative reactivity at a very high rate.

One other object of the present invention is to provide a nuclear reactor control system which is inherently fail-safe.

Additional objects advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

To achieve the foregoing and other objects, and in accordance with the purposes of the present invention as embodied and broadly described herein the apparatus of this invention may comprise a control element for reactivity control of a fission source. A volume of $^3$He is located in the fission source and has an atomic density of $^3$He effective to control the criticality of the fission source as the $^3$He is spin-polarized. An irradiation source is directed within the $^3$He for spin-polarizing the $^3$He. In one embodiment, an alkali metal vapor is included with the $^3$He where a laser spin-polarizes the alkali metal atoms which, in turn, spin-spin couple with $^3$He to spin-polarize the $^3$He atoms.

In another characterization of the present invention, a method is provided for controlling the reactivity of a reactor volume containing fissile material. A control volume is established within the reactor volume, where the control volume contains a quantity of $^3$He. The density of the $^3$He provides a selected reactivity control range as the $^3$He is spin-polarized. An alkali metal vapor is mixed with the $^3$He for spin-exchange with the $^3$He. The alkali metal vapor is irradiated within the control volume with a laser effective to spin-polarize the alkali metal vapor. The alkali metal vapor spin-polarization is transferred to the $^3$He through spin transfer to produce a density of polarized $^3$He effective for obtaining the selected reactivity range.

BRIEF DESCRIPTION OF THE DRAWINGS

The accompanying drawings, which are incorporated in and form a part of the specification, illustrate the embodiments of the present invention and, together with the description, serve to explain the principles of the invention. In the drawings:

FIG. 1A is a schematic representation of a reactivity control system in accordance with one embodiment of the present invention.

FIG. 1B illustrates neutron flux profiles within the reactor shown in FIG. 1A.

DETAILED DESCRIPTION OF THE INVENTION

Figure 2:
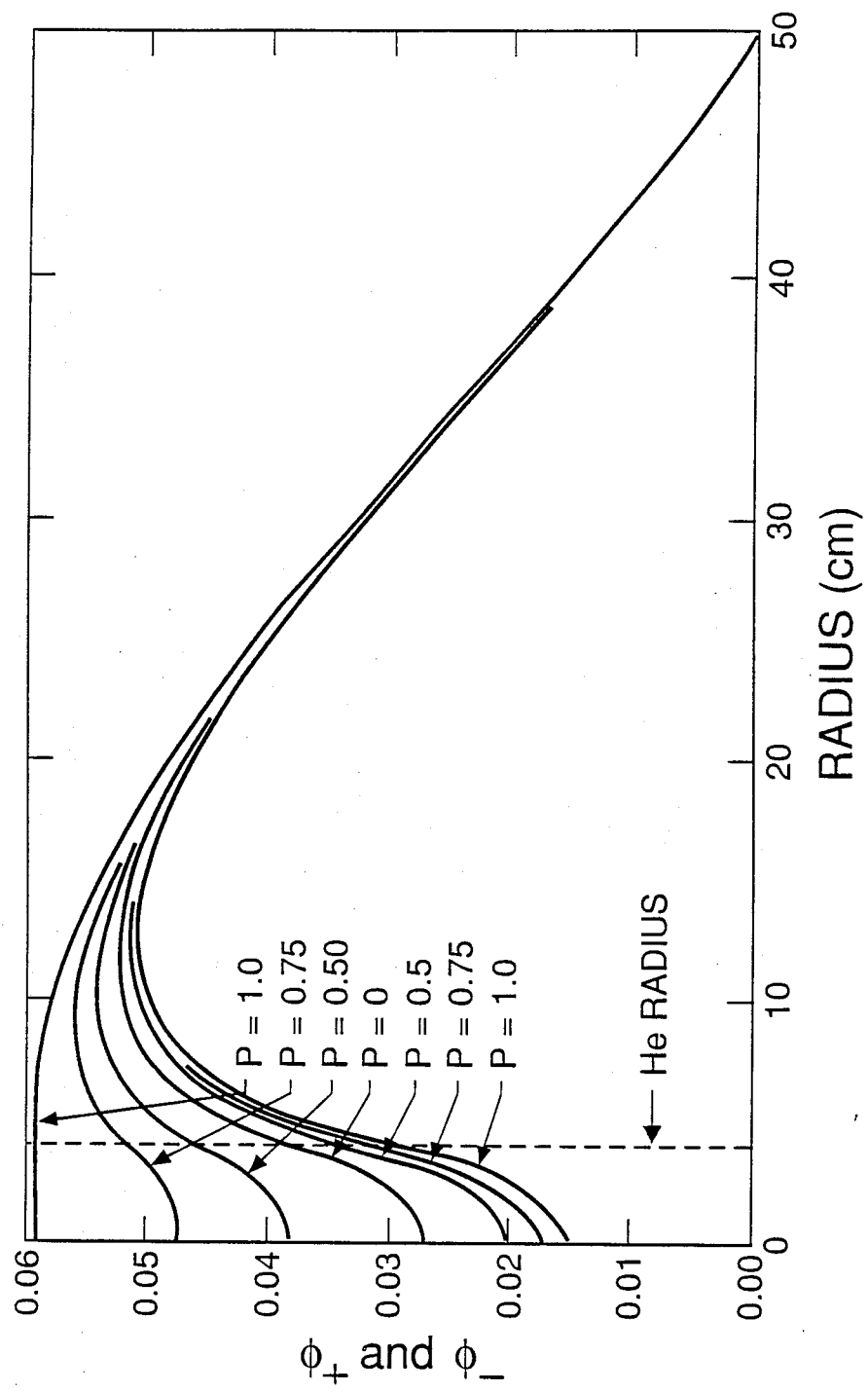
FIG. 2 graphically shows the radial dependence of the spin-up and spin-down neutron fluxes for values of $^3$He polarization at a density of $2.3 \times 10^{19}$ atoms/cm$^3$.

In accordance with the present invention, spin-polarization of $^3$He provides a differential cross section which is functionally related to the degree of spin-polarization of the $^3$He. More particularly, unpolarized $^3$He equally absorbs the neutron spin states in an unpolarized neutron flux with a cross section of 5333 barns. If the $^3$He is spin-polarized, e.g., to provide only spin-up atoms, spin-down neutrons would be absorbed with the cross section of 10,666 barns and the spin-up neutrons would hardly be absorbed at all. Thus, by way of visualization, if sufficient unpolarized $^3$He were initially available to absorb all of the neutrons, the spin-polarized $^3$He would still absorb all of the spin-down neutrons, but substantially all of the spin-up neutrons would be available for fission reactions. Thus the effect of spin-polarization of $^3$He is to increase the reactivity of the surrounding fissile material.

Referring now to FIG. 1A, there is shown a schematic drawing of one embodiment of a reactor control system according to the present invention. Reactor volume 10, herein a cylinder having a diameter and length of 1 m, includes a central, axial control volume having a diameter of 1 cm. Control volume 12 contains $^3$He at a density effective to absorb essentially all neutrons entering the control volume, i.e., a density of $3 \times 10^{20}$ atoms/cm$^3$. In the geometry shown in FIG. 1A, the control volume would depress the reactor reactivity by about 2%. If the $^3$He were now 100% polarized in the spin-up direction, the absorption cross section for the spin-down neutrons would about double, but the cross section for the spin-up neutrons would go to zero. Accordingly, the spin-up neutrons would not be absorbed at all, resulting in a reactivity increase of about 1%. Cylindroid coil 22 is provided about control volume 12 and can be used for spin polarization maintenance as hereinbelow discussed, or can be used to introduce a pulsed magnetic field within the control volume to depolarize the $^3$He substantially instantaneously for an emergency reactivity decrease of about 1%.

As shown in FIG. 1B, with the $^3$He initially unpolarized, a density of $^3$He is provided which is effective to absorb all of the neutrons at the center of control volume 12. Output light from laser 14 is directed through polarizing element 16 and reflected from optical element 18 and into reactor 10 along the axis of control volume 12. As the $^3$He polarization increases, the spin-up neutrons will see a decreasing cross section and the reactivity will start to increase. When the $^3$He is completely polarized substantially half of the neutrons will be uneffected by the control volume 12, as shown by the dashed flux profile 26 in FIG. 1B. Reactivity control is obtained by controlling the laser 14 input power and duration in order to maintain reactor 10 reactivity at a critical reactivity. If laser 14 fails, the $^3$He polarization will decrease and the neutron flux will return toward the unpolarized flux shown by curve 24 in FIG. 1B.

The polarization of $^3$He has been demonstrated in a cylindrical cell of 0.75 cm diameter, 4 cm length and at a pressure at 3.3 atmospheres. The cell was placed in an uniform magnetic field of a few gauss produced by a coil around the tube. A control volume mixture was prepared by mixing $^3$He and N$_2$ in a 6:1 ratio along with a few droplets of Rb. The cell was heated to 190° C. in order to vaporize the Rb Laser light was provided at 795 nm from a dye laser pumped with a 5 kW Kr ion laser which was circularly polarized. This light preferentially depopulates one of the ground-state magnetic sublevels of the Rb valence electron to spin-polarize the Rb. The $^3$He is then spin-polarized by spin-spin interaction arising from collisions with the polarized Rb atoms. A steady state $^3$He polarization of about 70% was achieved.

The polarization of gaseous $^3$He volumes is more particularly described by Chupp et al., "polarized, High-Density, Gaseous $^3$He Targets," 36 Phys. Rev. C, No. 6, 2244–2251 (December 1987), incorporated herein by reference. It is noted therein that polarized $^3$He of a density about 10$^{21}$ atoms/cm$^3$ and polarization of 50–90% can be produced by spin exchange with optically pumped alkali metal vapors, such as Rb and K. Polarization of $^3$He follows from spin exchange due to the hyperfine interaction during binary collisions with electron-spin polarized alkali-metal atoms.

To better understand the relationships between the $^3$He polarization, the neutron flux, and the $^3$He density, FIGS. 2–5 are provided in combination with the following analysis. When the $^3$He, and the resulting neutron flux, is unpolarized, the conventional criticality equation applies. For polarized $^3$He, the neutron spin direction must be taken into account and modified reactor criticality equations are required. The conventional criticality equation may be written:

$$D\nabla^2 \phi - \Sigma_a \phi = -\Sigma_f \Omega \phi, \text{ where} \tag{1}$$

$D$ = neutron diffusion coefficient;
$\Sigma_a$ = total macroscopic absorption cross section for fuel and moderator;
$\Sigma_f$ = macroscopic fission cross section for the fissile material;
$\Omega$ = average no. of neutrons emitted per fission.

The first term on the left is the rate of diffusion of neutrons into a differential volume element; the second term is the removal of neutrons by absorption including the absorption of neutrons which lead to fission. The term on the right is a source term which gives the rate of neutron generation by fission.

When a polarized absorber is present, the spin-up flux $\phi_+$ and the spin-down flux $\phi_-$ must be handled separately with appropriate coupling. Diffusion is governed by the same parameter D unless the moderator is polarized. The fission cross section is also the same in the absence of polarization of the fissile material. A magnetic guide field of few gauss in the vertical direction will preserve the neutron polarization direction introduced by the polarized $^3$He so that neutron polarization will not be lost in the diffusion process. The equations for the neutron fluxes can then be written:

$$D\nabla^2 \phi_+ - \Sigma_a \phi_+ = -\Sigma_f \Omega (\phi_+ + \phi_-)/2 \tag{2}$$
$$D\nabla^2 \phi_- - \Sigma_a \phi_- = -\Sigma_f \Omega (\phi_+ + \phi_-)/2, \text{ where}$$
$\phi_+$ = flux with neutron spin up;
$\phi_-$ = flux with neutron spin down.

As shown in Equation 2, the polarized neutron flux does not result in polarized neutrons being generated by the fission process. Thus, the fission output is divided by 2 since an equal number of spin-up and spin-down neutrons are produced by the fission process. The pair of equations are coupled by the source term for fission neutrons. Equation 2 may be rewritten as:

$$\nabla^2 \phi_+ + \alpha \phi_+ + \beta \phi_- = 0 \tag{3}$$
$$\nabla^2 \phi_- + \alpha \phi_- + \beta \phi_+ = 0, \text{ where}$$
$\alpha = -(\Sigma_a - \Sigma_f \Omega/2)/D;$
$\beta = (\Sigma_f \Omega/2D).$ Equation 3 may be solved as:

$$\nabla^2(\nabla^2 \phi_-) + 2\alpha \nabla^2 \phi_- + (\alpha^2 - \beta^2)\phi_- = 0$$
$$\nabla^2(\nabla^2 \phi_+) + 2\alpha \nabla^2 \phi_+ + (\alpha^2 - \beta^2)\phi_+ = 0 \tag{4}$$

To illustrate the relationship shown by Equation 4, a solution is presented for a spherical reactor including a control volume of radius "a" at its center containing $^3$He. Solving Equation 4 in spherical coordinates for r > a yields:

$$w_- = f(r) + Cg(r); \tag{5}$$
$$w_+ = f(r) - Cg(r), \text{ where}$$
$w = r\phi;$
$r$ = radius of reactor sphere with control sphere radius, $a$, and outer radius, $b$;
$f(r) = A (\sin \tau r - \tan \tau b \cos \tau r);$
$Cg(r) = C (\sinh \Delta' r - \tanh \tau' b \cosh \tau' r);$
$\tau = (\beta + \alpha)^{\frac{1}{2}};$
$\tau' = (\beta - \alpha)^{\frac{1}{2}};$ -continued C is evaluated as a boundary condition at radius $a$.

For $r<a$, Equation 2 becomes:

$$D\nabla^2\phi_+ - \Sigma_{a+}\phi_+ = 0 \quad (6)$$
$$D\nabla^2\phi_- - \Sigma_{a-}\phi_- = 0, \text{ where}$$
$$\Sigma_{a+} \neq \Sigma_{a-} \text{ because of } {}^3\text{He polarization.}$$

The solutions of Equation 6 for $r<a$, are then:

$$W_{i-} = C_- \sinh \pi_- r = C_- S_-$$

$$W_{i+} = C_+ \sinh \pi_+ r = C_+ S_+. \quad (7)$$

Since the diffusion constant D is the same in the inner and outer regions, Equations 5 and 7 must satisfy the following boundary conditions:

a. $w_{o-} = w_{i-}|_a$  (8)
b. $w_{o+} = w_{i+}|_a$
c. $w_{o-}' = w_{i-}'|_a$
d. $w_{o+}' = w_{i+}'|_a$, where ' is $dw/dr$.

Evaluating Equations 5 and 7 at $r=a$, with boundary conditions 8.a and 8.c and with 8.b and 8.d, the following criticality condition is obtained:

$$-(f/s_- - f'/s'_-)/(g/s_- - g'/S'_-) = (f/s_+ - f'/s'_+)/(g/s_+ - g'/S'_+) = C'. \quad (9)$$

Equations 5, 7, and 9 were used to calculate the performance of polarized $^3$He for reactor control for a reactor having the following parameters:

$a = 4$ cm
$b = 50$ cm
$^{235}U$ fission cross section = 582.6 barns
$^{235}U$ absorption cross section = 681 barns
$^{235}U$ average prompt neutrons per fission = 2.425
$^{235}U$ capture-to-fission ratio = 0.169
graphite atomic density = $8.1 \times 10^{22}$ atoms/cm$^3$
graphite absorption cross section = 2.96 millibarns
graphite carbon diffusion constant $D = 0.84$ cm
$^3$He unpolarized $(n,p)$ cross section = 5333 barns FIG. 2 graphically shows the radial dependence of the fluxes $\phi_+$ and $\phi_-$ for $^3$He polarization of 0, 0.5, 0.75, and 1. The $^3$He density is taken to be $2.9 \times 10^{19}$ atoms/cm$^3$. The lower three curves are for $\phi_-$; and the upper three curves are for $\phi_+$. The middle curve depicts the flux shape with no $^3$He polarization. As the $^3$He polarization increases, the $\phi_+$ increases faster than $\phi_-$ decreases, providing a reactivity increase for reactor control.

Figure 3:
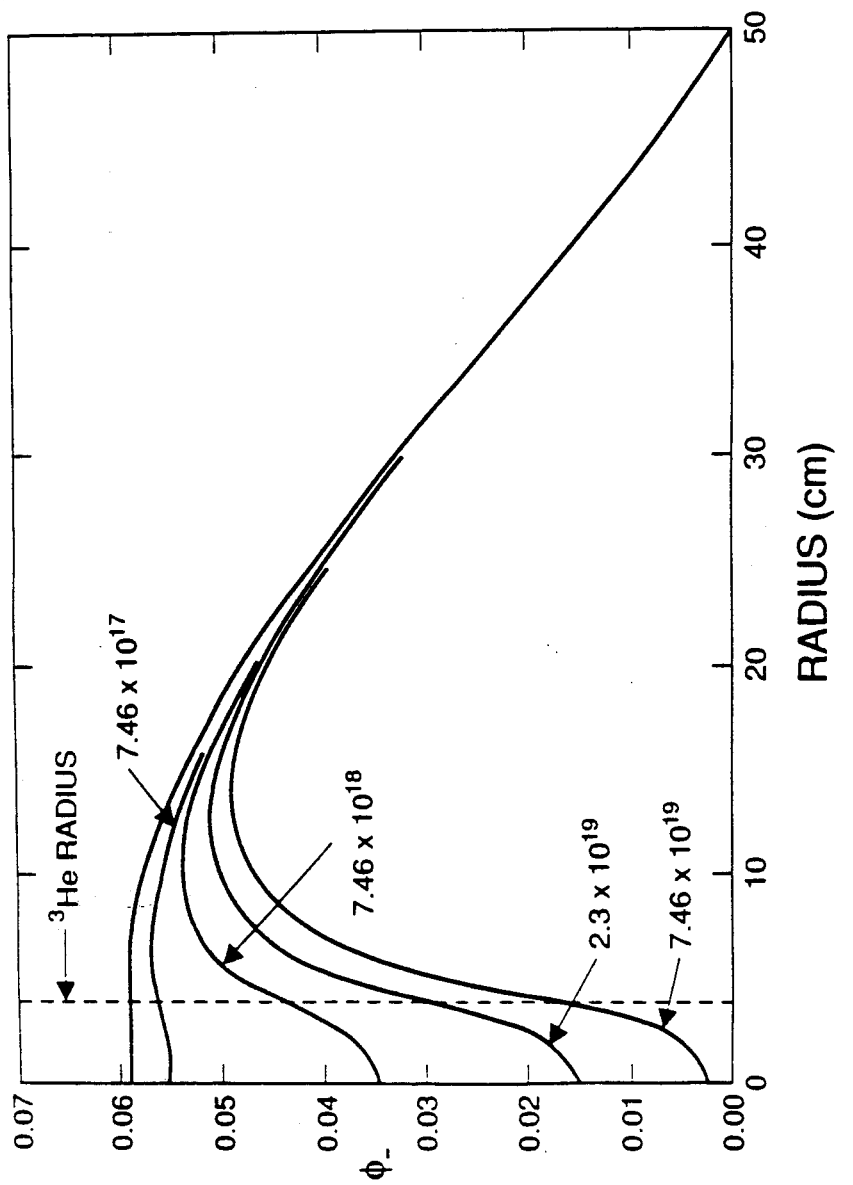
FIG. 3 graphically illustrates the dependence of the spin-down neutron flux on the density of $^3$He.

FIG. 3 graphically illustrates $\phi_-$ for changes in the $^3$He density over a factor of about 100, assuming a $^3$He polarization of 1. Polarized $^3$He densities in the range of $10^{19}$–$10^{20}$ atoms/cm$^3$ have been demonstrated for small volumes, but are considered well within the capability of available lasers for larger volumes.

Figure 4:
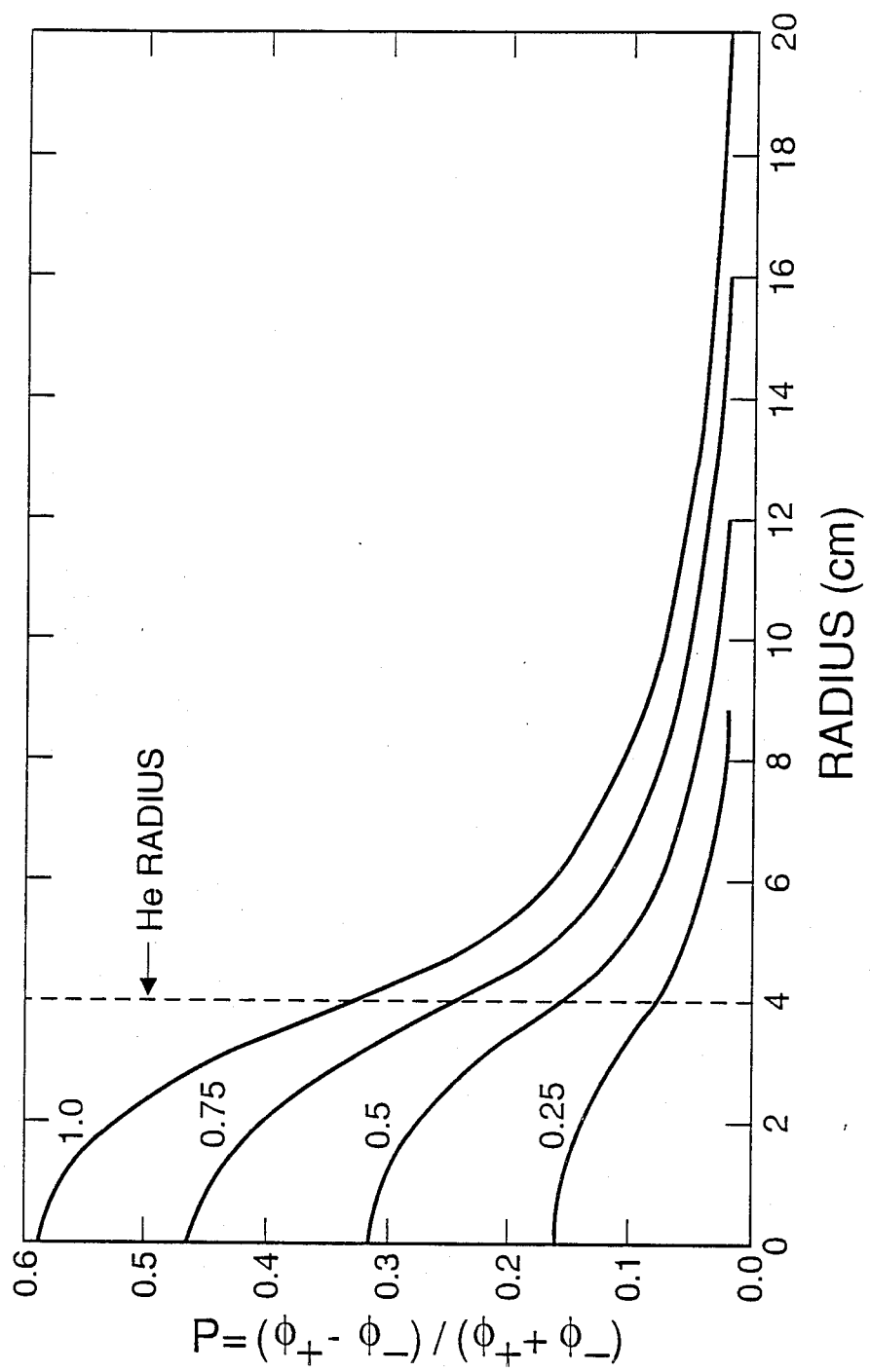
FIG. 4 graphically illustrates the radial dependence of the neutron flux polarization, p, in the reactor for indicated values of $^3$He polarization.

FIG. 4 graphically shows the neutron polarization, p, as a function of the radius for a $^3$He density of $2.3 \times 10^{19}$ atoms/cm$^3$ and for several values of the $^3$He polarization where $p = (\phi_+ - \phi_-)/(\phi_+ + \phi_-)$. The neutron polarization is substantial near the center of the sphere but drops away as the radius increases because of the generation of new unpolarized neutrons in the fissile material outside the control volume. If a high neutron polarization were the primary objective of the reactor design for experimental studies the $^3$He and the fissile material could be kept separated to provide an increased polarization of $^3$He over a larger volume.

Figure 5:
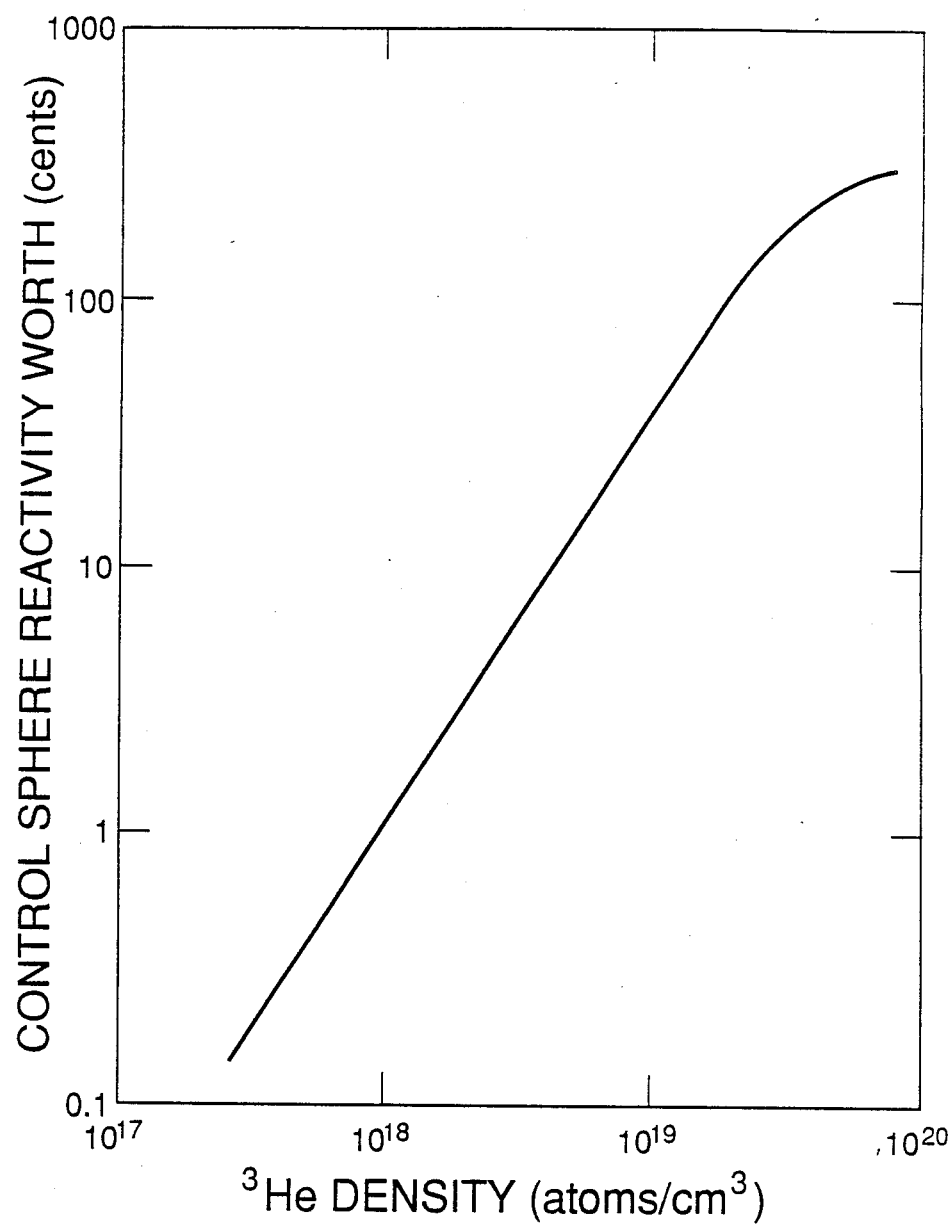
FIG. 5 graphically illustrates the change in reactivity from unpolarized to 100% polarized $^3$He as a function of the density of $^3$He in the reactor geometry depicted in FIGS. 2–4.

Finally, FIG. 5 shows the reactivity change from unpolarized to 100% polarized $^3$He as a function of a density of $^3$He. One cent of control worth is defined to be 0.01% change in reactor reactivity. As previously noted, a 1% (or 100 cents worth) reactor control swing is normally considered adequate for reactor control. FIG. 5 indicates that available $^3$He densities would provide adequate reactivity worth for reactor control, e.g., a density of $2 \times 10^{19}$ atoms/cm$^3$ provides more than 100 cents worth of reactivity.

In implementation to a large scale reactor, the polarization of relatively large amounts of $^3$He will be required. Further, the reactivity control for a water moderated reactor with greater neutron absorption would be less than for the graphite moderator assumed above. However, $^3$He polarization can be increased by increasing the laser beam power incident on the $^3$He control volume. This may be done by using either diode or titanium-sapphire lasers in place of the dye laser system.

Further, the $^3$He control volume must be maintained at a temperature effective to obtain the correct density of alkali metal Vapor, e.g., about 190° C. for a Rb vapor. The reactor itself could supply the necessary heat or an auxiliary heater element could be conventionally wrapped about the control volume.

As mentioned above, the polarized neutron flux would require a magnetic guide field of about 10 gauss in the same direction as the $^3$He polarization to preclude diffusion-induced depolarization. A field gradient of less than 1%/cm in directions perpendicular to the polarization is desired to prevent substantial depolarization of the neutrons when diffusing to regions of different field strength. The same coil producing the steady-state field could also be used to produce a strong magnetic field transient to rapidly quench the $^3$He polarization and to drive the reactor subcritical. A further consideration is burn-up of $^3$He in the control volume, wherein some provision must be made for replenishment of the $^3$He. For a high-power reactor, this depletion only occurs on a time scale of weeks. Since the $^3$He density required for adequate reactor control, e.g., is on the order of $10^{19}$–$10^{20}$, is on the order of 1 atmosphere, leakage is not a major concern.

Thus, the above calculations indicate that adequate reactivity control for a volume of fissile material can be provided by polarizing a control volume containing $^3$He. The system is fail-safe since loss of the laser function will result in $^3$He depolarization and a resulting insertion of negative reactivity within the reactor volume. Further, since mechanical constraints are eliminated reactivity insertion can be accomplished substantially instantaneously for the control of emergency transients. The availability of such rapid control system response will greatly reduce power transients arising from transient reactivity conditions with a concomitant increase in overall reactor safety.

The foregoing description of the preferred embodiments of the invention have been presented for purposes of illustration and description. It is not intended to be exhaustive or to limit the invention to the precise form disclosed, and obviously many modifications and variations are possible in light of the above teaching. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A method for controlling the reactivity of a reactor volume containing fissile material, including the steps of:

establishing a control volume within said reactor volume containing a quantity of $^3$He effective to control said reactor from a sub-critical to a critical reactivity as said $^3$He is spin-polarized with an alkali metal vapor effective for spin-exchange with said $^3$He;

irradiating said control volume with a laser effective to spin-polarize said alkali metal vapor for spin polarizing said $^3$He through said spin-exchange with said alkali metal to a spin-polarized density of said $^3$He in said control volume to obtain said reactivity control; and generating a guide magnetic field in said control volume oriented along the direction of said $^3$He spin polarization effective to maintain said $^3$He polarization and concomitant reactor reactivity.

2. A method according to claim 1, further including the step of generating a strong magnetic field transient in said control volume oriented along the direction of said $^3$He spin polarization effective to substantially depolarize said $^3$He within said control volume with a resulting increase in neutron absorption by said $^3$He and transition in reactor criticality to a sub-critical state.

* * * * *